(12) United States Patent
Grolle

(10) Patent No.: US 8,170,770 B2
(45) Date of Patent: May 1, 2012

(54) ADAPTIVE CRUISE CONTROL BRAKING WITH DECELERATION MONITORING

(75) Inventor: Kenneth A. Grolle, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 784 days.

(21) Appl. No.: 12/273,086

(22) Filed: Nov. 18, 2008

(65) Prior Publication Data

US 2010/0125399 A1    May 20, 2010

(51) Int. Cl.
*B60T 7/12* (2006.01)
(52) U.S. Cl. .......................................................... 701/96
(58) Field of Classification Search ..................... 701/96; 280/735
See application file for complete search history.

(56) References Cited

U.S. PATENT DOCUMENTS

| | | | |
|---|---|---|---|
| 4,982,805 A | 1/1991 | Naitou et al. | |
| 5,019,986 A | 5/1991 | Londt et al. | |
| 5,839,534 A | 11/1998 | Chakraborty et al. | |
| 5,868,214 A | 2/1999 | Workman | |
| 6,285,945 B1 | 9/2001 | Sielagoski et al. | |
| 6,854,550 B2 | 2/2005 | Gronau et al. | |
| 7,225,073 B2 | 5/2007 | Hedman et al. | |
| 7,321,819 B2 | 1/2008 | Seki | |
| 8,020,657 B2 * | 9/2011 | Allard et al. | 180/167 |
| 2004/0229728 A1 * | 11/2004 | Oshima et al. | 477/176 |
| 2009/0005943 A1 * | 1/2009 | Oshima et al. | 701/62 |
| 2009/0215586 A1 * | 8/2009 | Kresse | 477/110 |
| 2009/0251355 A1 * | 10/2009 | Nanami | 342/27 |
| 2010/0250088 A1 * | 9/2010 | Grolle et al. | 701/96 |
| 2011/0196591 A1 * | 8/2011 | Kuze | 701/96 |

* cited by examiner

*Primary Examiner* — Faye M. Fleming
(74) *Attorney, Agent, or Firm* — Calfee, Halter & Griswold LLP

(57) ABSTRACT

In one embodiment, a vehicle speed control device includes an electronic control unit (ECU). A forward vehicle sensor, electrically communicating with the ECU, generates a forward vehicle signal as a function of whether a forward vehicle is detected. The forward vehicle signal indicates a speed and a distance to the forward vehicle. A speed sensor, electrically communicating with the ECU, senses a driven vehicle speed. Control logic, electrically communicating with the ECU and the forward vehicle sensor, controls the driven vehicle speed as a function of a driven vehicle acceleration and the forward vehicle signal. The control logic sets a fault status as a function of the driven vehicle acceleration and the forward vehicle signal.

21 Claims, 5 Drawing Sheets

ADAPTIVE CRUISE CONTROL BRAKING WITH DECELERATION MONITORING

BACKGROUND

The present invention relates to an adaptive cruise control system. It finds particular application in conjunction with avoiding a fault condition of the adaptive cruise control system and maintaining braking based on the vehicle acceleration response and will be described with particular reference thereto. It will be appreciated, however, that the invention is also amenable to other applications.

It is becoming more common for heavy vehicles to include standard cruise control technology. Recent developments in cruise control technology have resulted in systems, commonly referred to as adaptive cruise control (ACC) systems, which are capable of measuring and maintaining a substantially constant following distance or headway distance relative to a forward vehicle. ACC systems in North America are typically programmed for passenger automobiles. For heavy vehicle applications, additional settings include "torque limiting" and "delayed braking." Vehicle acceleration when driving downhill must be monitored and braking response maintained.

It has become desirable to modify heavy vehicles that currently include the standard cruise control technology to also include ACC systems. An ACC system adapted from a passenger car model may cause a fault to be set when used on heavy vehicles. For example, the substantially higher mass of heavy vehicles, relative to passenger cars, causes a higher rate of downhill acceleration. When ACC is requesting deceleration of the vehicle and the vehicle deceleration does not adequately respond to the ACC request, then an issue with the system will be identified and a fault will be set.

In some vehicles, once a fault is set, the cruise control and ACC systems are disabled until the fault is cleared. Clearing the cruise control and ACC systems faults is typically a cumbersome and time consuming process that, for example, may require shutting-down and re-starting the vehicle engine.

The present invention provides a new and improved apparatus and method which addresses the above-referenced problems.

SUMMARY

In one embodiment, a vehicle speed control device includes an electronic control unit (ECU). A forward vehicle sensor, electrically communicating with the ECU, generates a forward vehicle signal as a function of whether a forward vehicle is detected. The forward vehicle signal indicates a speed and a distance to the forward vehicle. A speed sensor, electrically communicating with the ECU, senses a driven vehicle speed. Control logic, electrically communicating with the ECU and the forward vehicle sensor, controls the driven vehicle speed as a function of a driven vehicle acceleration and the forward vehicle signal. The control logic sets a fault status as a function of the driven vehicle acceleration and the forward vehicle signal.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
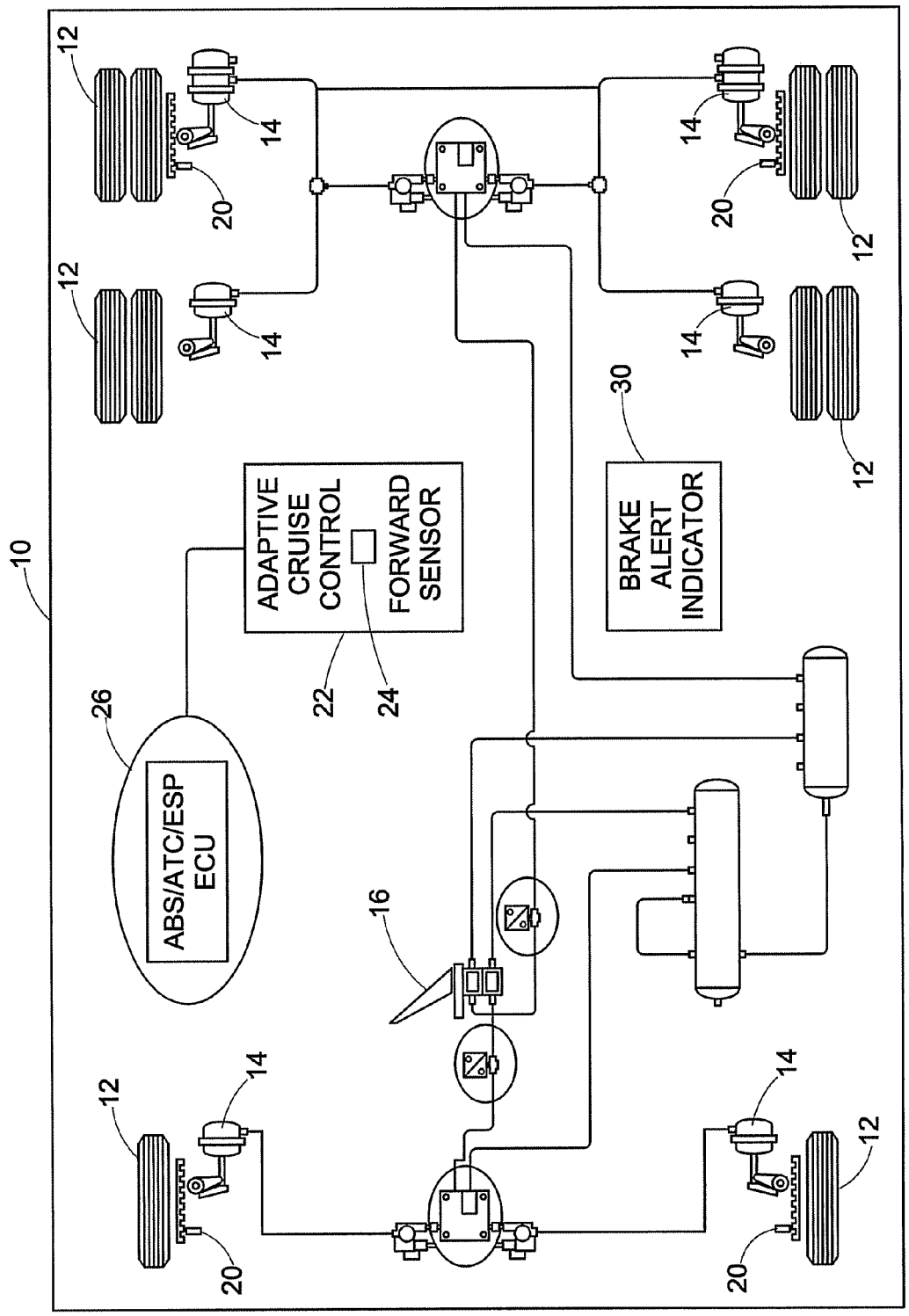
FIG. 1 illustrates a schematic representation of a vehicle in accordance with one embodiment of an apparatus illustrating principles of the present invention.

With reference to FIG. 1, a simplified component diagram of an exemplary vehicle 10 (e.g., a driven vehicle) is illustrated in accordance with one embodiment of the present invention. The vehicle 10 includes wheels 12 and associated respective vehicle brakes 14 (e.g., service brakes). A vehicle brake pedal 16 is used by an operator for manually applying the vehicle brakes 14. Wheel speed sensors 20 measure speeds of the respective wheels 12. An adaptive cruise control system 22, which includes a forward vehicle sensor 24, controls a speed of the vehicle 10.

The forward vehicle sensor 24 detects whether a "forward" vehicle is present. If a forward vehicle is present, the forward vehicle sensor 24 determines a forward distance and/or a lateral (sideways) distance to the forward vehicle relative to the driven vehicle. A speed of the forward vehicle (relative to the driven vehicle) is determined based on multiple measurements of the forward and lateral distances. An acceleration of the forward vehicle (relative to the driven vehicle) is determined based on multiple measurements (over time) of the speed of the forward vehicle. The forward vehicle sensor 24 determines whether the forward vehicle is within a predetermined distance in front of/to the side of the vehicle 10 as a function of the speed and/or an acceleration of the forward vehicle. Therefore, the predetermined distance changes based on the relative speeds and/or accelerations of the driven vehicle 10 and the forward vehicle. In that regard, the predetermined distance may be considered as a time gap between the driven vehicle 10 and the forward vehicle or as a following time of the driven vehicle 10 behind the forward vehicle.

An electronic control unit 26 (ECU), which electrically communicates with the adaptive cruise control system 22, controls application of the vehicle brakes 14 as part of, for example, an antilock braking system (ABS), an automatic traction control (ATC) system, and an electronic stability program system. In one embodiment, the cruise control system 22 includes control logic, electrically communicating with the ECU 26, that controls the vehicle speed as a function of an acceleration of the vehicle and whether a forward vehicle is sensed in front of the vehicle 10. It is to be understood the control logic of the cruise control system 22 may either be part of, or separate from, the ECU 26. As discussed in more detail below, the control logic acts as a means for setting a fault status of the cruise control system 22 as a function of the vehicle acceleration and the forward vehicle signal. A driver alert or manual brake alert indicator 30 (e.g., a visual indicator such as a dash light and/or an audible indicator such as a buzzer) alerts an operator of the vehicle 10 to manually apply the vehicle brakes 12 using, for example, the vehicle brake pedal 16.

Figure 2:
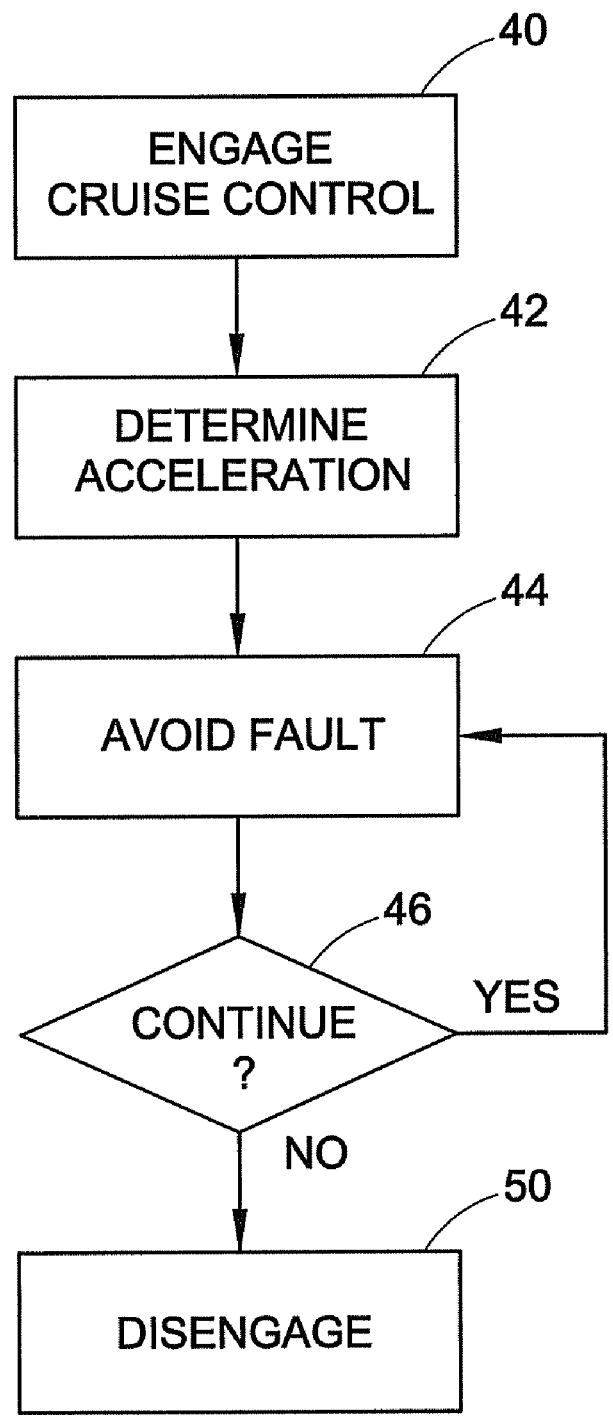
FIG. 2 is an exemplary methodology of avoiding a fault status in a cruise control system in accordance with one embodiment illustrating principles of the present invention.

With reference to FIGS. 1 and 2, an exemplary methodology is discussed for avoiding a fault in the adaptive cruise control system of the system shown in FIG. 1. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

The cruise control system is engaged in a step 40. In one embodiment, an acceleration of the vehicle 10 is determined in the step 42. A cruise control system 22 fault is avoided in a step 44. A determination is made whether to continue engagement of the cruise control system 22 in a step 46. If continued engagement of the cruise control system 22 is desired, control returns to the step 44. Otherwise, control passes to a step 50 for disengaging the cruise control system 22.

Two embodiments for avoiding the fault in the cruise control system 22 in the step 44 are discussed below.

Figure 3:
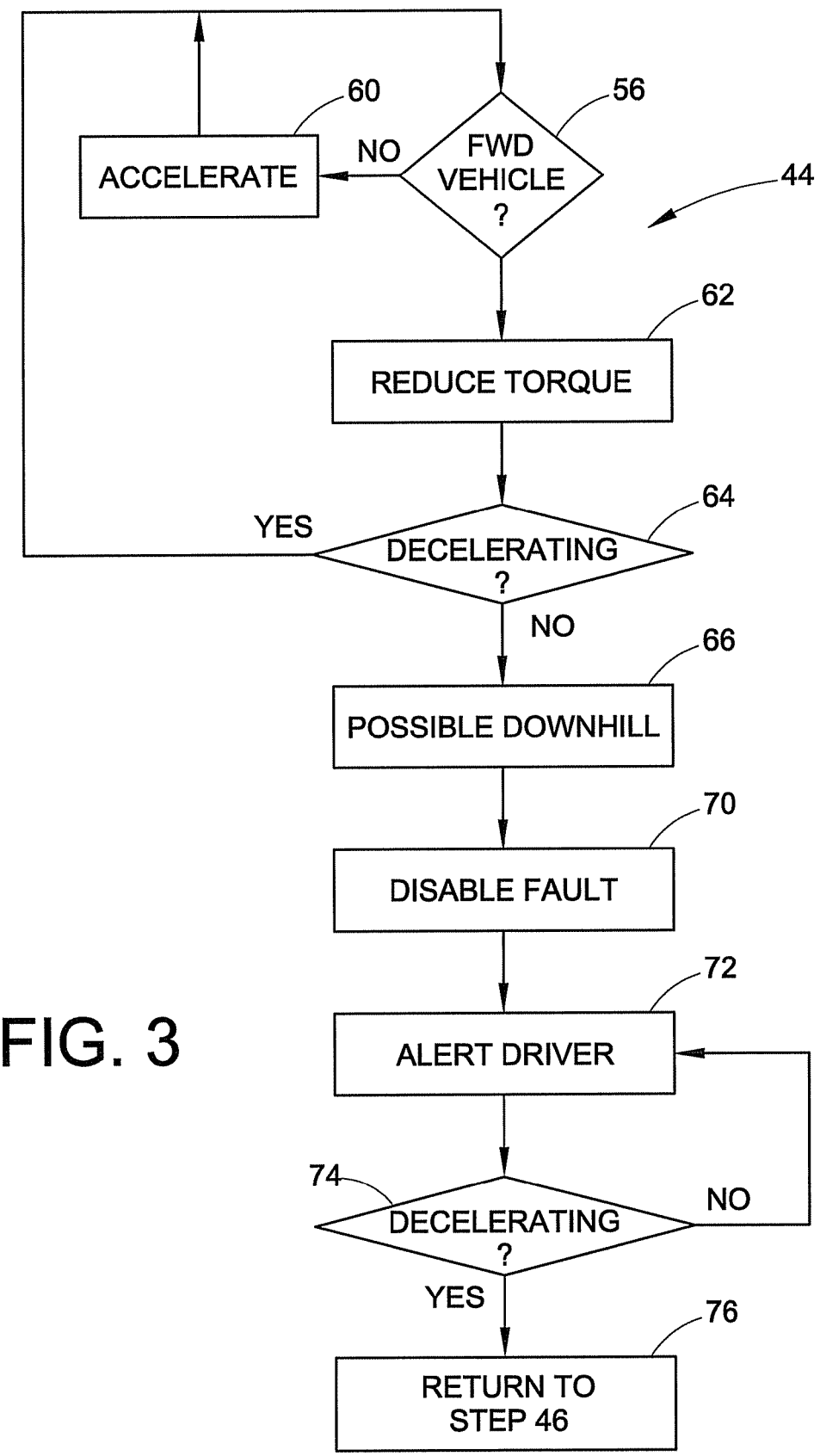
FIG. 3 is an exemplary methodology of one embodiment of avoiding the fault status in accordance with the present invention.

With reference to FIGS. 1-3, in a first embodiment of the step 44, the wheel speed sensors 20 and ECU 26 are used for determining a speed of the vehicle 10. A determination is made in a step 56 whether the forward vehicle sensor 24 detects a forward vehicle in front of the vehicle 10. The forward vehicle sensor 24 generates a forward vehicle signal as a function of whether a forward vehicle is detected within the predetermined distance. In one embodiment, the forward vehicle signal indicates a distance to the forward vehicle and also indicates a speed and/or acceleration of the forward vehicle. If a forward vehicle is not detected in the step 56, control passes to a step 60 for allowing the vehicle 10 to accelerate. Control then returns to the step 56 for determining if a forward vehicle is detected.

If a forward vehicle is detected in the step 56, control passes to a step 62 for reducing torque to an engine of the vehicle 10. A determination is then made in a step 64 whether the vehicle 10 is decelerating. For example, the wheel speed sensors 20 and ECU 26 determine a change in the speed of the vehicle 10 to determine if the vehicle 10 is decelerating. If it is determined that the vehicle 10 is decelerating, control then returns to the step 56 for determining whether a forward vehicle is detected. Otherwise, if it is determined in the step 64 that the vehicle 10 is not decelerating, control passes to a step 66.

In the step 66, a determination is made that the vehicle 10 may be traveling downhill. Then, since the vehicle 10 is accelerating while possibly traveling downhill, the deceleration monitor fault is temporarily disabled in a step 70. In other words, the control logic disables the fault status from being set to a faulted state. The vehicle operator is alerted using, for example, the manual brake alert indicator 30 to manually apply the vehicle brakes 14 in a step 72.

A determination is made in a step 74 whether the vehicle 10 is decelerating. If it is determined in the step 74 that the vehicle 10 is not decelerating, control returns to the step 72 for continuing to alert the vehicle operator to manually apply the vehicle brake 14. If, on the other hand, the vehicle 10 is decelerating, control passes to a step 76 for returning to the step 46.

Figure 4:
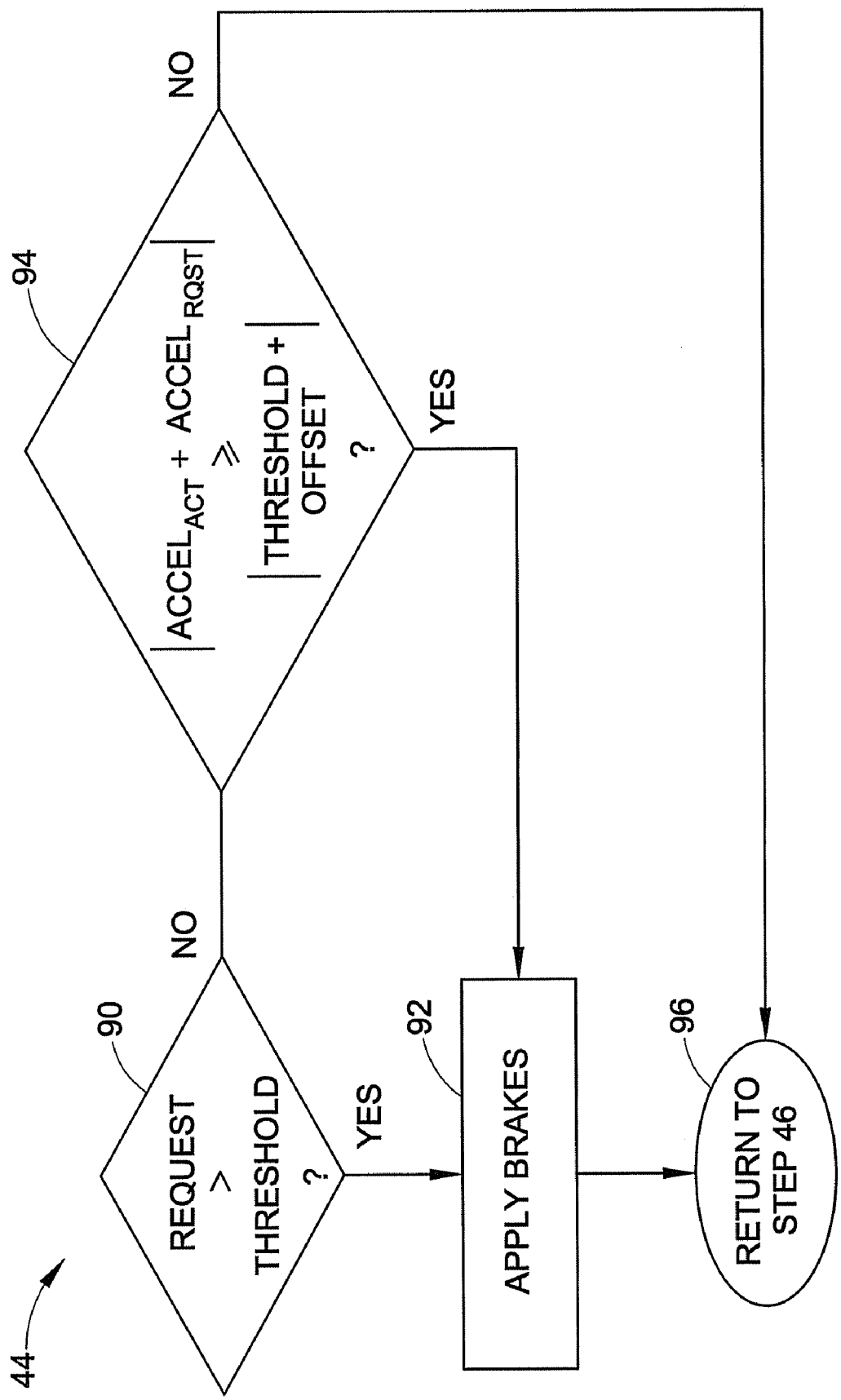
FIG. 4 is an exemplary methodology of another embodiment of avoiding the fault status in accordance with the present invention.

With reference to FIGS. 1, 2, and 4, in a second embodiment of the step 44, a determination is made in a step 90 whether more than a predetermined negative acceleration threshold (e.g., 1.2 m/s of deceleration or −1.2 m/s of acceleration) is being requested by the ACC. If it is determined in the step 90 that more than the predetermined negative acceleration threshold is being requested by the ACC, control passes to a step 92 for automatically applying the vehicle brakes 14 (e.g., foundation brakes). If, on the other hand, it is determined in the step 90 that more than the predetermined negative acceleration threshold is not being requested by the ACC, control passes to a step 94. By default, the operator is in control and can override any request.

In the step 94, a determination is made whether the absolute value of a sum of an actual vehicle acceleration and a requested acceleration is greater than or equal to the absolute value of a sum of an absolute brake application threshold and an offset brake application threshold (i.e., a determination is made whether $|\text{Vehicle\_Accel}_{Act} + |\text{Requested\_Accel}|| \geq |\text{Brake\_Apply}_{Threshold} + \text{Brake\_Apply}_{Offset}|$).

In a first example, the actual vehicle acceleration (Vehicle_Accel$_{Act}$) is +1.5 m/s, the requested acceleration (Requested_Accel) is −0.5 m/s, the absolute brake application threshold (Brake_Apply$_{Threshold}$) is −1.2 m/s, and the offset brake application threshold (Brake_Apply$_{Offset}$) is −0.3 m/s. Therefore, in the first example, |+1.5 m/s+|−0.5 m/s|| is +2.0 m/s; and |−1.2 m/s+(−0.3 m/s)| is +1.5 m/s. In this example, +2.0 m/s>+1.5 m/s.

In a second example, the actual vehicle acceleration (Vehicle_Accel$_{Act}$) is +1.0 m/s, the requested acceleration (Requested_Accel) is −0.3 m/s, the absolute brake application threshold (Brake_Apply$_{Threshold}$) is −1.2 m/s, and the offset brake application threshold (Brake_Apply$_{Offset}$) is −0.3 m/s. Therefore, in the second example, |+1.0 m/s+|−0.3 m/s|| is +1.3 m/s; and |−1.2 m/s+(−0.3 m/s)| is +1.5 m/s. In this example, +1.3 m/s<+1.5 m/s.

If it is determined in the step 94 that |Vehicle_Accel$_{Act}$+|Requested_Accel|| ≧ |Brake_Apply$_{Threshold}$+Brake_Apply$_{Offset}$| (e.g., the first example), control passes to the step 92 for automatically applying the vehicle brakes 14. In one embodiment, the vehicle brakes 14 are applied to decelerate the vehicle 10 to avoid the fault status of the cruise control system 22 being set to a faulted state.

If, on the other hand, it is determined in the step 94 that |Vehicle_Accel$_{Act}$+|Requested_Accel||<|Brake_Apply$_{Threshold}$+Brake_Apply$_{Offset}$| (e.g., the second example), control passes to a step 96 for returning to the step 46 (see FIG. 2).

After the vehicle brakes 14 are applied in the step 92, control passes to the step 96 for returning to the step 46 (see FIG. 2).

Figure 5:
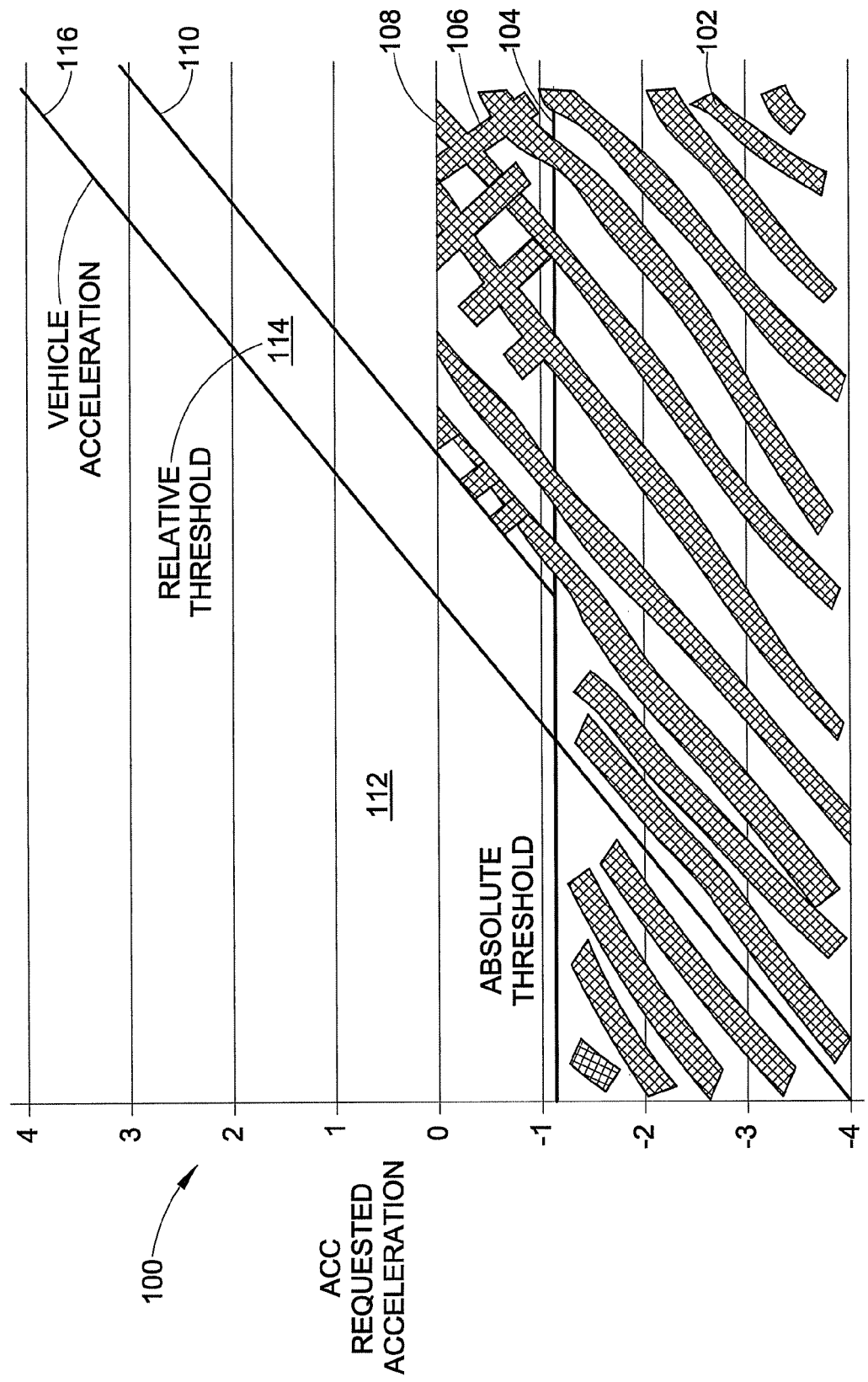
FIG. 5 is a graph illustrating application of vehicle brakes in accordance with one embodiment of the present invention.

With reference to a graph 100 in FIG. 5, it is possible to see if and at what actual vehicle acceleration ACC foundation brakes will be applied. ACC brake application is represented on the graph 100 by the shaded areas. An ACC requested acceleration (Y-axis) is identified. If the ACC requested acceleration along the Y-axis is less than an absolute threshold (see line 104), the vehicle brakes will be applied. If the ACC requested acceleration along the Y-axis is between 0 and −1.2, the vehicle brakes will be applied when a relative threshold exceeds the ACC requested acceleration (see area 106). Vehicle braking will not occur if the ACC requested acceleration is positive.

With reference to FIGS. 1 and 5, the requested negative acceleration (deceleration) exceeds the predetermined negative acceleration threshold, the vehicle brakes 14 are applied for decelerating the vehicle 10 (see area 102 below a horizontal line 104 representing the predetermined negative acceleration threshold (e.g., −1.2 m/s acceleration) in the graph 100). When the requested negative acceleration (deceleration) does not exceed the predetermined negative acceleration threshold, the vehicle brakes 14 are applied if |Vehicle_Accel$_{Act}$+|Requested_Accel||≧|Brake_Apply$_{Threshold}$+Brake_Apply$_{Offset}$| (i.e., see an area 106 below a line 108 representing zero (0) ACC requested acceleration, above the horizontal line 104, and below/right of a line 110 representing the relative threshold in the graph 100). Otherwise, if |Vehicle_Accel$_{Act}$+|Requested_Accel||<|Brake_Apply$_{Threshold}$+Brake_Apply$_{Offset}$|, the vehicle brakes are not applied (i.e., see the area 112 above the horizontal line 104 representing the predetermined negative acceleration threshold and the area 112 above/left of the line 110 representing the relative threshold in the graph 100). ACC will request negative acceleration.

The area 106 of the graph 100 represents conditions under which the vehicle brakes 14 were not previously applied, but that cause the vehicle brakes 14 to be applied in the present invention. An area 114 of the graph 100 between a line 116 and the line 110 (representing the relative threshold) in the graph 100 represents a time when the vehicle brakes are not applied. However, the vehicle brakes are applied relatively later (e.g., below/right of a line 110) because the offset brake application threshold (Brake_Apply$_{Offset}$) is a negative value (e.g., −0.3 m/s) in the above examples. The relatively later application of the vehicle brakes 14 results in a relatively stronger application once the vehicle brakes 14 are applied.

In one embodiment, the relatively stronger application of the vehicle brakes 14 causes a slight jolt of the vehicle 10 that is noticeable by the operator of the vehicle. The slight jolt is intended to convey a message to the vehicle operator that the vehicle is accelerating at a rate deemed unacceptable.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A vehicle speed control device, including:
    an electronic control unit (ECU);
    a forward vehicle sensor, electrically communicating with the ECU, which generates a forward vehicle signal as a function of whether a forward vehicle is detected, the forward vehicle signal indicating a speed and a distance to the forward vehicle;
    a speed sensor, electrically communicating with the ECU, which senses a driven vehicle speed; and
    control logic, electrically communicating with the ECU and the forward vehicle sensor, controlling the driven vehicle speed as a function of a driven vehicle acceleration and the forward vehicle signal, the control logic setting a fault status as a function of the driven vehicle acceleration and the forward vehicle signal, wherein if a negative acceleration request from the control logic exceeds a predetermined negative acceleration threshold in the ECU, the control logic causes the ECU to apply vehicle brakes for decelerating the driven vehicle and wherein if the negative acceleration request does not exceed the predetermined negative acceleration threshold, the vehicle brakes are applied if an absolute value of a sum of an actual driven vehicle acceleration and an absolute value of the negative acceleration request is greater than or equal to an absolute value of a sum of the predetermined negative acceleration threshold and an offset brake application threshold.

2. A vehicle speed control device, including:
    an electronic control unit (ECU);
    a forward vehicle sensor, electrically communicating with the ECU, which generates a forward vehicle signal as a function of whether a forward vehicle is detected, the forward vehicle signal indicating a speed and a distance to the forward vehicle;
    a speed sensor, electrically communicating with the ECU, which senses a driven vehicle speed; and
    control logic, electrically communicating with the ECU and the forward vehicle sensor, controlling the driven vehicle speed as a function of a driven vehicle acceleration and the forward vehicle signal, the control logic setting a fault status as a function of the driven vehicle acceleration and the forward vehicle signal, wherein: the control logic disables the fault status from being set to a faulted state if the driven vehicle acceleration is positive and the forward vehicle is detected within the predetermined distance.

3. The vehicle speed control device as set forth in claim 1, wherein: a negative value for the offset brake application threshold causes the vehicle brakes to be applied relatively later than an absolute brake application threshold.

4. The vehicle speed control device as set forth in claim 1, wherein: the relatively later application of the vehicle brakes results in a relatively stronger application of the vehicle brakes when the vehicle brakes are applied; and the relatively later and relatively stronger application of the vehicle brakes causes a relatively faster deceleration of the driven vehicle.

5. The vehicle speed control device as set forth in claim 2, wherein: the control logic causes the ECU to apply vehicle brakes before the fault status is set to a faulted state.

6. The vehicle speed control device as set forth in claim 2, wherein: the control logic requests a reduction of engine torque once the forward vehicle is detected and the forward vehicle is within the predetermined distance.

7. The vehicle speed control device as set forth in claim 6, wherein: the control logic causes a driver alert to be activated once the faulted state is disabled.

8. The vehicle speed control device as set forth in claim 7, wherein: the fault status is disabled after the vehicle brakes are applied and the driven vehicle is decelerating.

9. A vehicle speed control device, including: an electronic control unit (ECU); a forward vehicle sensor, electrically communicating with the ECU, which generates a forward vehicle signal as a function of whether a forward vehicle is sensed within a predetermined distance; a speed sensor, electrically communicating with the ECU, sensing a driven vehicle speed; and control logic, electrically communicating with the ECU and the forward vehicle sensor, controlling the driven vehicle speed as a function of the driven vehicle acceleration, the forward vehicle signal, and a negative acceleration request, the control logic avoiding a faulted state when the driven vehicle is accelerating wherein if the negative acceleration request exceeds a predetermined negative acceleration threshold, the control logic causes the ECU to apply vehicle brakes for decelerating the driven vehicle and wherein if the negative acceleration request does not exceed the predetermined negative acceleration threshold, the vehicle brakes are applied if an absolute value of a sum of an actual driven vehicle acceleration and an absolute value of the negative acceleration request is greater than or equal to an absolute value of a sum of the predetermined negative acceleration threshold and an offset brake application threshold.

10. The vehicle speed control device as set forth in claim 9, wherein: a negative value for the offset brake application threshold causes the vehicle brakes to be applied relatively later; and the relatively later application of the vehicle brakes causes a relatively faster deceleration of the driven vehicle to avoid the faulted state.

11. A vehicle speed control device, including: an electronic control unit (ECU); a forward vehicle sensor, electrically communicating with the ECU, which generates a forward vehicle signal as a function of whether a forward vehicle is sensed within a predetermined distance; a speed sensor, electrically communicating with the ECU, sensing a driven vehicle speed; and control logic, electrically communicating with the ECU and the forward vehicle sensor, controlling the driven vehicle speed as a function of the driven vehicle acceleration, the forward vehicle signal, and a negative acceleration request, the control logic avoiding a faulted state when the driven vehicle is accelerating wherein the control logic disables the fault status from being set to a faulted state if the driven vehicle continues to accelerate after ACC requests deceleration.

12. The vehicle speed control device as set forth in claim 11, wherein: the control logic causes a driver alert to be activated once the faulted state is disabled.

13. A vehicle speed control device, including: an electronic control unit (ECU); a forward vehicle sensor, electrically communicating with the ECU, which generates a forward vehicle signal as a function of whether a forward vehicle is detected within a predetermined distance; a speed sensor, electrically communicating with the ECU, sensing a driven vehicle speed; control logic for controlling the vehicle speed as a function of a driven vehicle acceleration and the forward vehicle signal; and means for setting a fault status as a function of the driven vehicle acceleration and the forward vehicle signal wherein the means for setting includes the control logic; and the control logic causes the ECU to apply vehicle brakes before the fault status is set to a faulted state.

14. A vehicle speed control device, including: an electronic control unit (ECU); a forward vehicle sensor, electrically communicating with the ECU, which generates a forward vehicle signal as a function of whether a forward vehicle is detected within a predetermined distance; a speed sensor, electrically communicating with the ECU, sensing a driven vehicle speed; control logic for controlling the vehicle speed as a function of a driven vehicle acceleration and the forward vehicle signal; and means for setting a fault status as a function of the driven vehicle acceleration and the forward vehicle signal wherein if a negative acceleration request exceeds a predetermined negative acceleration threshold, the means for setting causes the ECU to apply vehicle brakes for decelerating the driven vehicle to avoid a faulted state and wherein if the negative acceleration request does not exceed the predetermined negative acceleration threshold, the vehicle brakes are applied if an absolute value of a sum of an actual driven vehicle acceleration and the negative acceleration request is greater than or equal to an absolute value of a sum of the predetermined negative acceleration threshold and an offset brake application threshold.

15. The vehicle speed control device as set forth in claim 13, wherein: the means for setting disables the fault status from being set to a faulted state if the driven vehicle is accelerating and the forward vehicle is detected within the predetermined distance.

16. The vehicle speed control device as set forth in claim 15, wherein: the means for setting causes a driver alert to be activated once the faulted state is disabled.

17. A method for setting a fault status of a vehicle speed control device, the method including: generating a forward vehicle signal as a function of whether a forward vehicle is sensed within a predetermined distance, the forward vehicle signal indicating a distance to, and acceleration of, the forward vehicle; determining a driven vehicle acceleration; controlling the driven vehicle acceleration as a function of the forward vehicle signal; and setting a fault status as a function of the driven vehicle acceleration and the forward vehicle signal.

18. The method for setting a fault status of a vehicle speed control device as set forth in claim 17, further including: applying vehicle brakes before the fault status is set to a faulted state.

19. The method for setting a fault status of a vehicle speed control device as set forth in claim 17, further including: applying vehicle brakes, for decelerating the driven vehicle and avoiding the fault status being set to a faulted state, if a negative acceleration request exceeds a predetermined negative acceleration threshold.

20. The method for setting a fault status of a vehicle speed control device as set forth in claim 17, further including: disabling the fault status from being set to a faulted state if the driven vehicle is accelerating and the forward vehicle is detected within the predetermined distance.

21. The method for setting a fault status of a vehicle speed control device as set forth in claim 20, further including: alerting a vehicle operator to apply driven vehicle brakes if the driven vehicle is accelerating and the forward vehicle is detected within the predetermined distance.

* * * * *